United States Patent
Kim

(10) Patent No.: US 11,960,537 B1
(45) Date of Patent: Apr. 16, 2024

(54) USER-DEFINED MIXED PLAYLIST PLAYBACK MODE

(71) Applicant: Tae Moon Kim, Arlington, VA (US)

(72) Inventor: Tae Moon Kim, Arlington, VA (US)

( * ) Notice: Subject to any disclaimer, the term of this patent is extended or adjusted under 35 U.S.C. 154(b) by 0 days.

(21) Appl. No.: 18/160,643

(22) Filed: Jan. 27, 2023

(51) Int. Cl.
*G06F 16/00* (2019.01)
*G06F 7/00* (2006.01)
*G06F 16/638* (2019.01)
*G06F 16/68* (2019.01)

(52) U.S. Cl.
CPC .......... *G06F 16/639* (2019.01); *G06F 16/686* (2019.01)

(58) Field of Classification Search
CPC .............................. G06F 16/639; G06F 16/686
USPC ........................................................ 707/740
See application file for complete search history.

(56) References Cited

U.S. PATENT DOCUMENTS

| | | | |
|---|---|---|---|
| 10,133,545 B2 | 11/2018 | Gibson et al. | |
| 11,184,645 B2 | 11/2021 | Bates | |
| 2005/0240661 A1* | 10/2005 | Heller | G06F 16/4387 709/219 |
| 2006/0265421 A1* | 11/2006 | Ranasinghe | G06F 16/64 |
| 2008/0016205 A1* | 1/2008 | Svendsen | G06F 16/40 709/224 |
| 2011/0125297 A1* | 5/2011 | Chu | G06F 16/639 707/E17.101 |
| 2012/0197897 A1* | 8/2012 | Knight | H04N 21/25808 707/E17.046 |
| 2014/0074959 A1* | 3/2014 | Alsina | H04N 21/4331 709/219 |
| 2016/0188286 A1* | 6/2016 | Greene | G11B 27/102 715/716 |
| 2018/0227545 A1* | 8/2018 | Wooden | H04N 7/163 |
| 2019/0258669 A1 | 8/2019 | Moss et al. | |
| 2022/0398275 A1* | 12/2022 | Klein, Jr. | H04W 8/245 |
| 2023/0060539 A1* | 3/2023 | DiMaria | G06F 16/639 |

\* cited by examiner

*Primary Examiner* — Raquel Perez-Arroyo
(74) *Attorney, Agent, or Firm* — Cybernetic Law PLLC; John Hocker

(57) ABSTRACT

Systems and methods including determining and storing a respective user-defined weight value of each of a plurality of source playlists, and, in response to receiving a real time user request to play a user-defined mixed playlist (UDMP), performing real time dynamic playback of the UDMP based on the stored weight values. The method and system may be related to streaming media services, such as audio and/or video streaming media services.

14 Claims, 15 Drawing Sheets

USER-DEFINED MIXED PLAYLIST PLAYBACK MODE

BACKGROUND

1. Field

Embodiments relate generally to media (e.g., streaming audio, video) playback applications, systems, and methods, and more particularly are directed to playlist playback management or streaming media playback management.

2. Related Art

Patent Literature 1 (U.S. Patent Publication No. 2019/0258669 A1, published Aug. 22, 2019).

3. Description of the Related Art

Various methods have been proposed for playing playlists or streams related to a single item or topic. For example, in Patent Literature 1, a media service device user identifies a seed genre, a seed style of music (e.g., rap, R&B), a seed song or a seed artist (e.g., REM), and the media service may play a list of popular songs that are matched to the seed. However, a user may desire to have more autonomy regarding the device shuffled/randomized playback of a set of songs, for example. Moreover, Patent Literature 1 one does not address accommodating a scenario where a user wants to listen to a mix from more than one playlist or seed topic, much less, the implementation details of the playback control of the same. It may be undesirable (e.g., boring) for the user to be constrained to one topic (e.g., one artist, one genre, one composer, one instrument). In some examples in the related art, a user must continuously listen to one playlist topic until all the songs in the topic playlist are played.

Patent Literature 1 does not disclose a user-friendly method for integrating two different categories of seeds, such as Trumpet and Elvis Presley, much less two different topics from the same category. Thus, there is a need for improvements to media playback management systems and methods, including in user interface (UI)/user experience (UX) functionality and media playback control. There are other shortcomings of the methods in the related art, as discussed below.

The above information is presented as background information only to assist with an understanding of the disclosure. No determination has been made, and no assertion is made, as to whether any of the above might be applicable as prior art regarding the disclosure.

SUMMARY

Aspects of the disclosure address at least the above-mentioned and below-mentioned problems and/or disadvantages and to provide at least the advantages described below.

As discussed above, there is a need for improvements to media playback management systems and methods, including in user interface (UI)/user experience (UX) functionality and media playback control. According to various embodiments, the present disclosure provides features and components to increase user friendliness/ease of use of electronic devices and methods that capture, track and manage media playlists. For example, various embodiments of the disclosure provide a combination of sources and/or categories of music that can be played, thereby providing a mixture of artist, composer, instrument, genre, etc.

Also, the ratio of the combination of sources can easily be managed through the graphical UI (GUI) displaying a weigh input area.

Such methods and interfaces may complement or replace conventional methods for media playlist management. These electronic devices, methods and GUIs reduce the cognitive burden on a user and produce a more efficient human-machine interface. For battery-operated devices, such electronic devices, methods and GUIs conserve power and increase the time between battery charges by providing a more efficient human-machine interface.

Accordingly, an aspect of the disclosure is to provide a responsive server system method performed by one or more hardware servers. The responsive server system method may include: causing a display of an electronic terminal device to display a graphical user interface (GUI) with user input areas; receiving, from the electronic terminal device, user input into at least one input area of the user input areas; determining, based on the received user input, a respective weight value of each of a plurality of source playlists, the plurality of source playlists being audio or video media item playlists; storing, in a real time database, the determined weight values of each of the plurality of source playlists as a user-defined mixed playlist (UDMP); receiving a real time user request to play the UDMP; and in response to receiving the real time user request to play the UDMP, performing real time dynamic playback of the UDMP based on the stored weight values. The causing of the display to display the GUI may include transmitting, over a network using a communication interface, information (e.g., GUI control information) to the electronic terminal device, which causes/controls the electronic terminal device to display the GUI based on receiving the transmitted information. Other operations involving display by the electronic terminal device may have a similar function regarding receiving the display information via transmission from the server.

According to an embodiment, the performing of the real time dynamic playback of the UDMP includes: (i) automatically limiting a playable set of source playlists, from among the plurality of source playlists, to the source playlists that satisfy a weight condition, (ii) automatically randomly selecting a next source playlist from among the limited playable set of source playlists, (iii) automatically dynamically selecting a next song from the randomly selected next source playlist, and (iv) automatically performing playback control to cause the selected next song to be played (e.g., by the electronic terminal device and/or a peripheral device, such as ear buds/headphones, connected to the electronic terminal device). The limiting of the playable set of source playlists may include removing the respective source playlists from the playable set of source playlists that do not satisfy the weight condition.

According to an embodiment, the performing of the real time dynamic playback of the UDMP includes: (i) automatically limiting a playable set of source playlists, from among the plurality of source playlists, to the source playlists that satisfy a weight condition, (ii) automatically randomly selecting a next source playlist from among the limited playable set of source playlists, (iii) automatically dynamically selecting a next song from the randomly selected next source playlist, (iv) automatically performing playback control to cause the selected next song to be played, and (v) automatically updating, in the real time database, a play count of the randomly selected source playlist to reflect the selected next song has been played (e.g., by adding+1 to the play count of the randomly selected next source playlist), wherein the satisfaction of the weight condition is based on a result of a comparison between the respective stored weight value of the respective source playlist (e.g., the randomly selected next source playlist) and the play count of the respective source playlist (e.g., the randomly selected next playlist), wherein the limiting of the playable set of source playlists includes removing the respective source playlists that do not satisfy the weight condition from the playable set of source playlists. For example, any source playlists that include a zero value or Null (no value) for the weight value do not meet the weight condition. As another example, any source playlists having a play count that is greater than or equal to the weight value may be removed from the playable set of source playlists. Removing a source playlist may correspond to creating a UDMP with the removed source playlist omitted.

According to an embodiment, the determining of whether the weight condition of the plurality of source playlists is satisfied includes: comparing, for each of the plurality of source playlists, the respective stored weight value of the respective source playlist and the play count of the respective source playlist to determine whether the play count of the respective source playlist meets or exceeds a weight threshold corresponding to the stored weight value; and in response to determining the play count of the respective source playlist meets or exceeds the weight threshold corresponding to the stored weight value: determining the weight condition is not satisfied.

According to an embodiment, a previous source playlist and the next source playlist are not prevented from being the same during the random selection. That is, a source playlist may repeat consecutive plays, as long as the weight condition remains satisfied, according to an embodiment. According to an embodiment, the next song is selected from the randomly selected source playlist in a shuffle mode, wherein the shuffle mode requires that no songs from a same source playlist are repeated during the playback period. The playback period may correspond to playing the UDMP until the playable set of songs is zero (i.e., all of the source playlists have played all of the songs such that the weight condition is no longer satisfied for any song).

According to an embodiment, the GUI displays the user input areas next to titles of the plurality of source playlists, which correspond to the plurality of source playlists. According to an embodiment, each of the titles of the source playlists may correspond to at least one of: artist, genre, composer, or instrument. According to an embodiment, the user input weight corresponds to a number of times a user desires to listen to a source playlist having a title displayed adjacent to the respective input area.

Another aspect of the disclosure is to provide a responsive server system comprising: a memory; and processing circuitry, wherein the processing circuitry is configured to executed computer-executable instructions stored in the memory to performing the following operations: causing a display of an electronic terminal device to display a graphical user interface (GUI) with user input areas; receiving, from the electronic terminal device, user input into at least one input area of the user input areas; determining, based on the received user input, a respective weight value of each of a plurality of source playlists, the plurality of source playlists being audio or video media item playlists; storing, in a real time database, the determined weight values of each of the plurality of source playlists as a user-defined mixed playlist (UDMP); receiving a real time user request to play the UDMP; and in response to receiving the real time user request to play the UDMP, performing real time dynamic playback of the UDMP based on the stored weight values.

Another aspect of the disclosure is to provide a non-transitory computer-readable medium comprising computer-executable instructions that, when executed by processing circuitry, cause the processing circuitry to perform the following operations: receiving, from an electronic terminal device, user input into at least one input area of the user input areas; determining, based on the received user input, a respective weight value of each of a plurality of source playlists, the plurality of source playlists being audio or video media item playlists; storing, in a real time database, the determined weight values of each of the plurality of source playlists as a user-defined mixed playlist (UDMP); receiving a real time user request to play the UDMP; and in response to receiving the real time user request to play the UDMP, performing real time dynamic playback of the UDMP based on the stored weight values.

BRIEF DESCRIPTION OF DRAWINGS

The above and other aspects, features, and advantages of certain embodiments of the disclosure will be more apparent from the following description taken in conjunction with the accompanying drawings, in which.

In the drawings, the same reference numbers are used to depict the same or similar elements, operations, features, and components.

DETAILED DESCRIPTION OF THE INVENTION

Figure 1A:
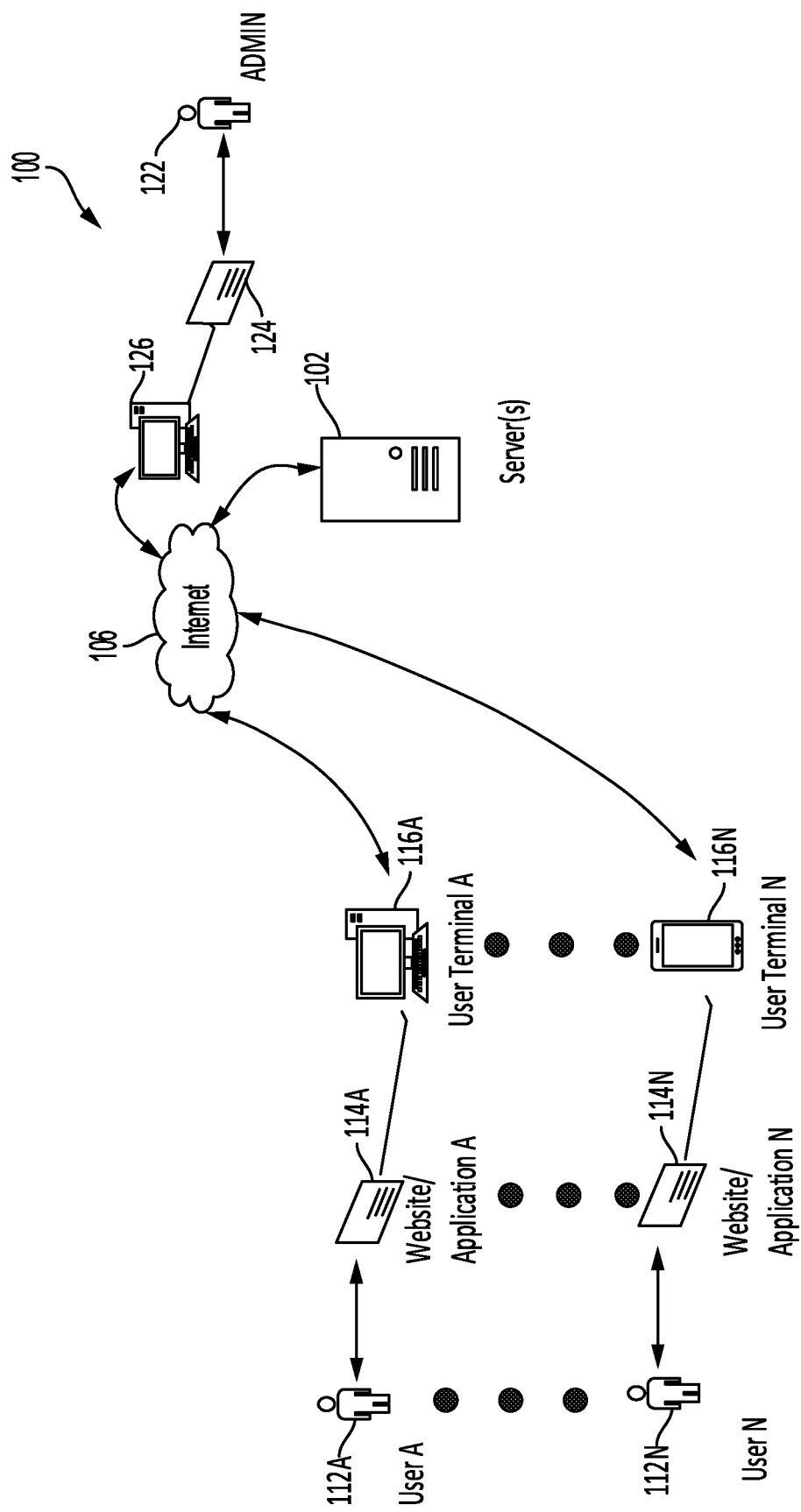
FIG. 1A illustrates a diagram of a networked computer system that may execute a method, according to an embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. The terminology used in the following description and claims is for the purpose of referring to specific embodiments only, and is not intended to limit the invention, but are merely used by the inventor(s) to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents. Unless defined otherwise, all terms including technical and scientific terms used herein have the same meaning as commonly understood by those of ordinary skill in the art to which the present disclosure belongs. Commonly used terms defined in a dictionary are additionally interpreted as having a meaning consistent with the related technical literature and the presently disclosed content, and unless defined, are not interpreted in an ideal or very formal meaning.

As used herein, the singular forms "a," "an," and "the" include the plural forms unless the context clearly indicates otherwise. Thus, for example, reference to "a server" includes reference to one or more of such servers. The meaning of "comprising," as used herein, specifies a particular characteristic, region, integer, step, operation, element and/or component, and other specific characteristic, region, integer, step, operation, element, component, and/or group. It does not exclude the existence or addition of anything.

With reference to the accompanying drawings, the embodiments of the disclosure will be described in detail so that those of ordinary skill in the art can easily carry out the embodiments. However, the inventive concepts may be embodied in several different forms and is not limited to the embodiments described herein. According to various embodiments, the present disclosure provides features and components to increase user friendliness/ease of use of methods for organizing and management playback of digital media items (e.g., audio files, such as songs/playlists and/or multimedia such as video clips) including by way of providing a user experience including navigation of display user interfaces (e.g., GUIs).

According to an embodiment, a playlist is a list of video or audio files that can be played back on a media player either sequentially or in a shuffled order. According to an embodiment, an audio playlist is a list of songs. According to an embodiment, download songs may be stored at each playlist and played back whenever needed.

User-Defined Mixed-Playlist System

FIG. 1A illustrates a diagram of a networked computer system 100 that may execute a method, according to an embodiment. The networked computer system 100 may be a user-defined mixed-playlist (UDMP) playback management system. The networked computer system 100 may include one or more responsive servers (e.g., media content server 102) and a plurality of user terminals (User Terminal A (116A)— User Terminal N (116N), and Admin Terminal 126). Although three user terminals are shown, the number of user terminals may be more.

The user terminals 116 and 126 may be communicably connected via a network 106 (Internet 106) to communicate with the responsive server(s) 102. The server(s) 102 may correspond to more than one networked server, such as a media content server and a user account server. The user terminals may correspond to electronic computing devices, such as an electronic computing device 150 described in FIG. 1B, and the server(s) 102 may each correspond to the server 180 described in FIG. 1C.

The user terminals/electronic computing devices 116A, 116N and 126 are shown as a desktop computer (with a monitor), and smartphones (a type of mobile electronic devices), respectively, but the user terminals may be any type of electronic computing device, such as a desktop personal computer (PC), a smartphone (mobile device), a tablet computer, a laptop computer, a personal digital assistant (PDA), an e-book reader, a connected smart speaker or listening device (e.g., Amazon Echo or Google Nest), and the like.

According to an embodiment, the networked computer system 100 may include a plurality of user accounts stored in a database of the server(s) 102. Each of the user accounts may be associated with one or more users 112A-112N, which may correspond to a media playing account (e.g., where a user logs in to access their media or stream media, such as songs and/or videos). The server may also store one or more admin accounts for admin users (e.g., Admin User 122).

The user terminals 116A-116N and 126 may correspond to any electronic computing device that a respective user 112A-112N or 126 is logged into. In this respect, for example, when user 112A is logged into the website or application 114A, the current electronic computing device the user 112A is using is the user 112A's user terminal 116A. When the user 112A logs in from a different electronic computing device, that different electronic computing device is user 112A's user terminal 116A. The software is application and/or portal driven, and hence, it does not matter which electronic computing device/user terminal a user logs into, as the application is accessible from different connected computing devices.

Admin Terminal 126 is an electronic computing device that has an admin user logged in. An admin user is a user designated as an administrator of the streaming service or media content provider. The admin user terminal 126 may communicate with the other user terminals 116A-116N and/or with responsive server(s) 102 over network 106. The user terminals may execute certain tasks. In an embodiment, the user terminal(s) and/or server may perform the method 200 or method 300. Portions of the method 200 of FIG. 2 and/or the method 300 of FIG. 3 may overlap.

As described above, the user terminals and/or responsive servers may perform various operations and/or methods described herein. The responsive server(s) may perform some or all the processing with relation to the methods performed by the user terminals (electronic computing devices).

Electronic Device

Figure 1B:
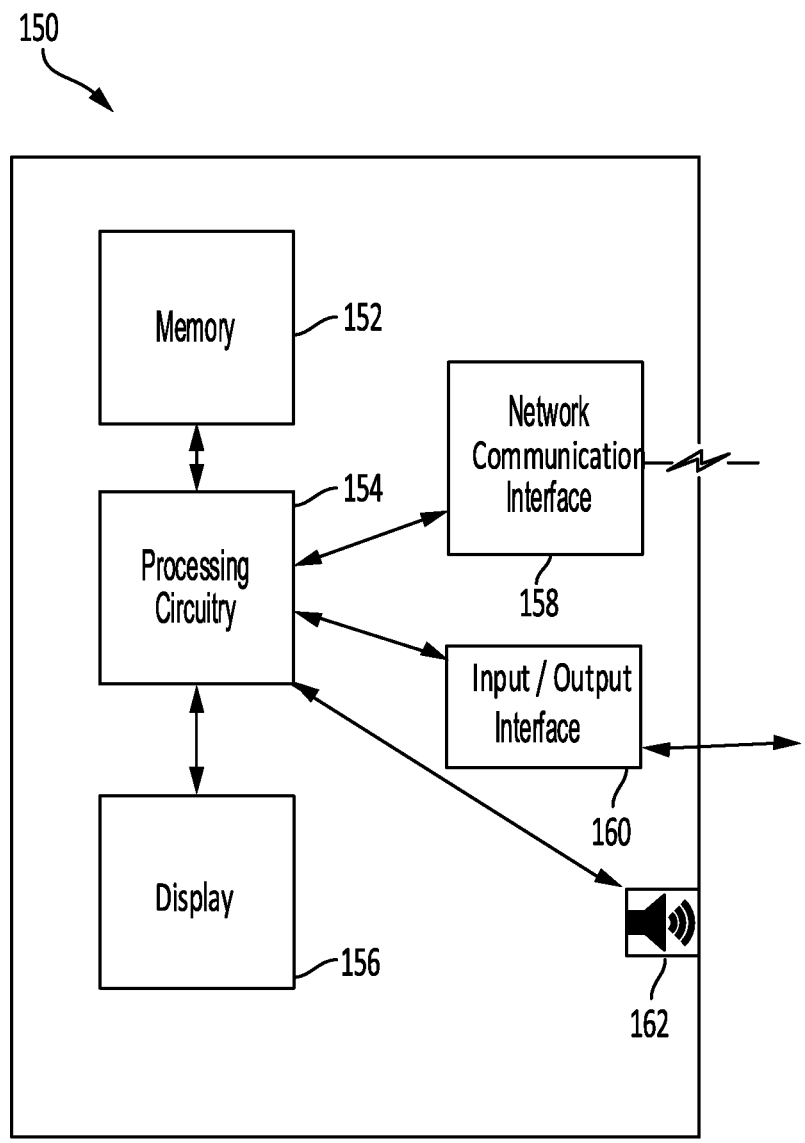
FIG. 1B illustrates a detailed view of an electronic computing device that can be used to implement the various components and/or methods described herein, according to certain embodiments.

FIG. 1B illustrates a detailed view of an electronic computing device 150 that can be used to implement the various components and/or methods described herein, according to certain embodiments. Any of the user terminals 116A-116N may correspond to electronic computing device 150. FIG. 1B illustrates various components that may be included in either the electronic computing device 150 or the server(s) 180 illustrated in FIG. 1C.

In an embodiment of the disclosure, as shown in FIG. 1B, the electronic computing device 150 may include one or more memories 152, processing circuitry 154 (e.g., a controller, a hardware processor), a display 156, a network communication interface 158, an input/output (I/O) interface 160 and a speaker 162. The speaker 162 may be internal or external (e.g., wireless headphones speakers).

The processing circuitry 154 may include and provide functionality by way of one or more processors (e.g., a hardware processor, a virtual processor, a distributed processor, central processing units (CPUs), a specialized processor, such as a Graphics Processing Unit (GPU), and/or Application Specific Integrated Circuits (ASICs)) executing computer-executable instructions (software) embodied in one or more tangible (non-transitory), computer-readable media.

The computer-readable media may correspond to the one or more memories 152, which may hereinafter be referred to as a memory 152. According to an embodiment, memory 152 may be a local memory 152 or local data storage 152. According to an embodiment, the memory 152 may be media associated with a storage device, memory devices or chips, internal mass storage (e.g., Read-Only Memory (ROM), a Random-Access Memory (RAM)), a Compact Disc (CD), a Digital Versatile Disc (DVD), a thumb-drive, a removable hard drive, a solid-state drive, legacy magnetic media (e.g., a tape drive, a floppy disc drive), a specialized ASIC-based device, and/or the like.

The software implementing various embodiments of the present disclosure can be stored in the memory (e.g., storage devices and/or media) and executed by processing circuitry 154. "Computer readable media" or "computer readable medium" as used in connection with the disclosure include non-transitory media, transmission media, and/or carrier waves.

The computer readable media and/or memory 152 may store computer code/instructions (software) for performing various computer-implemented functions. The computer code may include instructions that, when executed by the processing circuitry 154, causes the processing circuitry to execute various functions, processes, parts, operations and/or methods (collectively referred to hereinafter as functions or operations). Reference to a computer-readable media can include a circuit (such as an integrated circuit (IC)) storing software for execution, a circuit embodying logic for execution, or both, where appropriate. The present disclosure includes any suitable combination of hardware and software.

The various functions, operations, and methods pertinent to this disclosure are explained in detail below. However, other functions, operations and methods that are known to one or ordinary skill in the art could also be performed. The processing circuitry 154 may be configured to perform the various operations (e.g., by being programmed to do so via computer executable instructions) discussed in more detail herein.

The software may cause the processing circuitry 154 and specifically the processor(s) to execute particular processes or particular parts of particular processes described herein, including defining data structures stored in RAM and modifying such data structures according to the processes defined by the software. In addition, or as an alternative, the processing circuitry 154 may provide functionality because of logic hardwired or otherwise embodied in a circuit, which can operate in place of or together with software to execute particular processes or particular parts of particular processes described herein. Reference to software can encompass logic, and vice versa, where appropriate.

The electronic computing device 150 may further include a communication interface 158 electrically coupled to the processing circuitry 154. The communication interface 158 may be configured to receive data transmitted from one or more electronic devices (e.g., user terminal devices, other electronic devices) and/or one or more servers. The communication interface 158 may be a network communication interface 158. Networks may be, for example, wired, wireless, or optical. Networks can provide real-time data transfer and include a local area network (LAN), a wide-area network (WAN), and/or the Internet. Examples of networks include Ethernet, wireless LANs, cellular networks (e.g., Global System for Mobile Communications (GSM)), 3G, 4G, 5G, Long-Term Evolution (LTE)).

The communication interface 158 may be configured to transmit, via, for example, control by the processing circuitry 154, data to the one or more electronic computing devices over a network (wired or wirelessly). The processing circuitry 154 may also include interface to one or more communication networks (e.g., via the communication interface 158). The processing circuitry 154 may be configured to control (or cause) the display 156 to display information, or alternatively, transmit the display information over the communication interface 158 to another electronic computing device, or over the input/output interface 160 to a standalone display device for external display.

As shown in FIG. 1B, the electronic computing device 150 may also include or be at least configured to be electrically connected (or wirelessly connected) to one or more output devices (e.g., external, or internal). The electronic computing device 150 may use the input/output interface 160 to communicate with one or more external peripheral devices, such as, one or more of: a display device (e.g., an external desktop monitor, a touch screen display panel, etc.), a keyboard, a microphone (e.g., for voice input), a camera (e.g., for gesture input), a mouse, a speaker, a microphone, a joystick, a scanner, a trackpad, a printer, and/or a biometric capture device (e.g., a device that captures one or more of: fingerprint, palm print, iris information, etc.). The peripheral devices may include user input devices (e.g., a mouse, keyboard, microphone) and/or output devices (e.g., speaker, display) and be connected to the processing circuitry 154 by the network communication interface.

The I/O interface 160 may be wired (e.g., universal serial bus (USB) drive, external RAM/ROM, external processor, data port) or wireless (e.g., short-range communication protocols, syncing, Bluetooth®, radio frequency (RF), near field communication (NFC) or Wi-Fi®). The network communication interface 158 may be wired or wireless. The I/O interface 160 may be electrically coupled to the processing circuitry 154 and the processing circuitry 154 may be configured to control (or cause) the I/O interface 160 to transmit information between the device 150 and other electronic devices or peripherals. At least a portion of the I/O interface 160 may be provided on an outer surface of a housing of an electronic computing/display device (e.g., a smartphone).

The display 156 may include any type of display including a projector or a display screen, such as, a touch screen display panel, an organic light-emitting diode (OLED) screen, a liquid crystal display (LCD) screen, a cathode ray tube (CRT) screen, and/or glasses. The display 156 may be electrically coupled to the processing circuitry 154 and the processing circuitry 154 may be configured to control (or cause) the display 156 to display information (e.g., display the information discussed in the methods and operations below). The display 156 may be provided on an outer surface of a housing of an electronic computing/display device (e.g., a smartphone) or be an external display monitor connected to a standalone electronic computing device (e.g., a PC connected to a monitor, where the monitor is the display).

The speaker(s) 162 may include any type of speaker including a smartphone/tablet speaker(s) and/or wired or wireless headphone speakers (also referred to as earbuds). The speaker(s) 162 may be electrically coupled to the processing circuitry 154 and the processing circuitry 154 may be configured to control (or cause) the speaker(s) 162 to output sound, such as by playing a song. (e.g., play a song as discussed in the methods and operations below). The speaker(s) 162 may be provided on an outer surface of a housing of an electronic computing/display device (e.g., a smartphone) or be an external speaker.

Figure 1C:
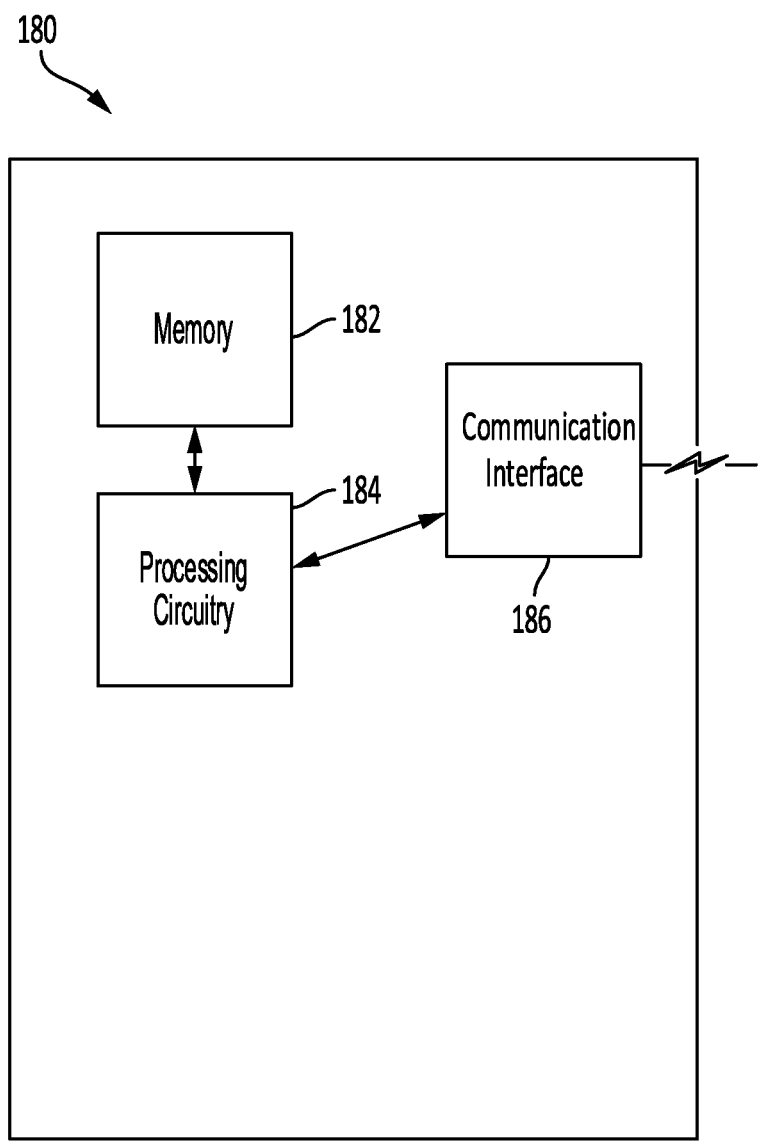
FIG. 1C illustrates a detailed view of a responsive server that can be used to implement the various components and/or methods described herein, according to some embodiments.

FIG. 1C illustrates a detailed view of a responsive server 180 that can be used to implement the various components and/or methods described herein, according to some embodiments. In particular, the responsive servers 102 in FIG. 1A may correspond to the responsive server 180 illustrated in FIG. 1C. The detailed view illustrates various components that may be included in either the electronic computing device 150 illustrated in FIG. 1B or the responsive server 180 illustrated in FIG. 1C.

In an embodiment of the disclosure, as shown in FIG. 1C, the responsive server 180 may include one or more memories 182 (e.g., a local memory or local data storage), processing circuitry 184 (e.g., a controller, a hardware processor) and a communication interface 180 electrically coupled to the processing circuitry 184. The communication interface 186 may be configured to receive data transmitted from one or more external electronic computing devices (e.g., electronic computing devices 116A-116N, 126), and/or one or more other servers.

The processing circuitry 184 may be configured to store, in the memory 182, data received from various sources over the network. For example, the processing circuitry 184 may be configured to store information received as data from the communication interface 186.

The responsive server 180 may be configured to provide automatic real time updates to the respective electronic computing devices, as discussed below. Real time may correspond to instantaneous, near real time (near instantaneous) or a combination thereof. The processing circuitry 184 may be connected to each of the other components of the server(s) 180 and may communicate, via communication interface 186, with one or more of the components of the electronic device 150 of FIG. 1A. The communication interface 186 may correspond to and include the same functionality as network communication interface 158 discussed above.

The components shown in FIGS. 1A-1C are exemplary in nature and are not intended to suggest any limitation as to the scope of the disclosure. While explaining the responsive server 180 according to certain embodiments, a detailed description of the contents (e.g., processing circuitry, media, memory, communication interface) overlapping with the electronic computing device 150 were/are omitted.

According to an embodiment, the electronic computing device structure and/or functionality may also be performed by the responsive server(s) 180. According to an embodiment, the functionality of the server may be performed by the electronic computing device (or user terminal) 150. The functionality of the electronic computing devices, as defined by the logged in user, may also be performed by one of the other user terminal electronic computing devices.

They device 150 and server 180 may correspond to a music streaming system. The UDMP music playing system is not only for the media items (e.g., songs) downloaded and installed on the off-line music playing devices such as mobile phones, music players and PCs, etc., but can also easily be incorporated into an on-line streaming system through the Internet or any other networks. A user simply registers a UDMP in the streaming system. The streaming system provider must prepare a platform of UDMP and UDMP mode of playing music.

Playback Modes

Shuffle play is a mode of music playback (or video playback) in which songs (or videos) are played in a randomized order that is decided upon for all songs at once. Shuffle playback prevents repeated songs (or videos), which makes it distinct from random playback, in which the next song (or video) is chosen at random after the last song (or video) has finished playing. Shuffle play and random play may be found on digital audio players and media player software and CD players.

Shuffle playback corresponds to where a song (or video) is not repeated (i.e., every song (or video) in the playlist is played once). Random playback is where a song can be repeated an unlimited number of times (e.g., a song is randomly selected from the playlist). Sequential Playback corresponds to where all the songs in the playlist are played in sequential order by, for example, the title of songs/videos and/or date stored etc.

In the related art, a single playlist is selected and all the songs in the selected playlist will be played in either shuffle or sequential mode. When all the songs in the playlist are played, then the selected, same playlist will be repeated. Alternatively, a user can select another playlist or a next playlist will be selected sequentially and played (or playback may stop). Thus, there is a need in the art for improved playback modes in conjunction with improved playlist data structure(s).

Figure 2:
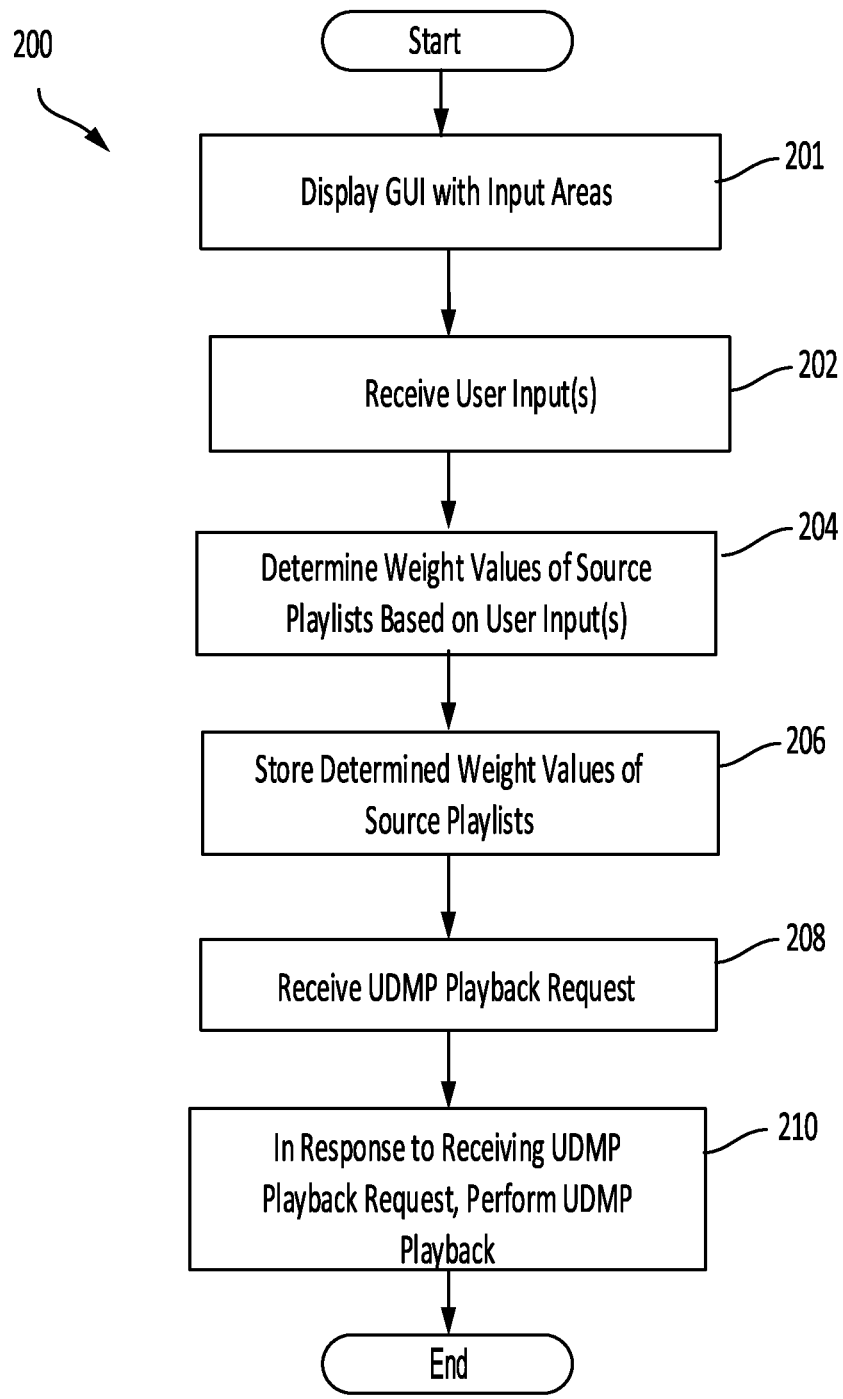
FIG. 2 illustrates a flow chart of a real time responsive server method performed by processing circuitry, according to certain embodiments of the disclosure.
Figure 3:
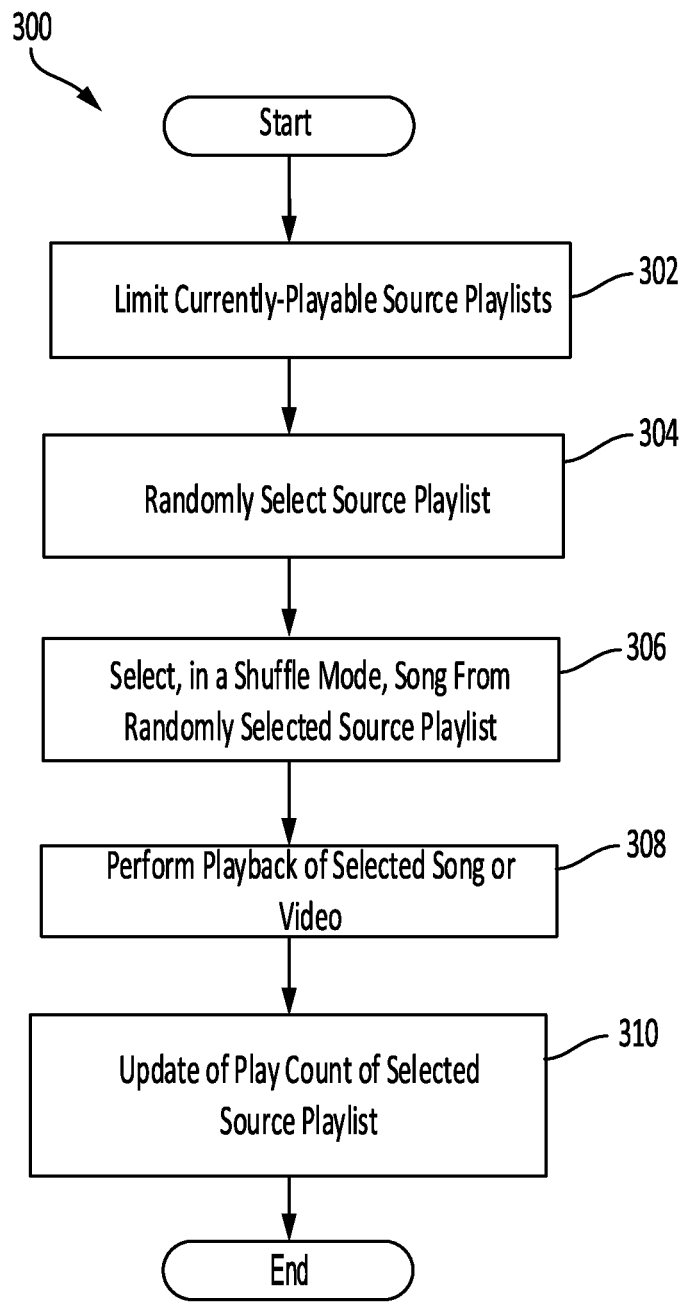
FIG. 3 illustrates a flow chart of a real time responsive server method performed by processing circuitry, according to certain embodiments of the disclosure.

FIG. 2 illustrates a flow chart of a real time responsive server method 200 performed by processing circuitry, according to certain embodiments of the disclosure. The processing circuitry may correspond to the processing circuitry 154 or 184 discussed in FIGS. 1B and 1C above, or correspond to a combination of the processing circuitry of the electronic computing device 150 being controlled by (or receiving user interface information from) the responsive server 180. As discussed below, the processing circuitry 154 or 184 may be configured to execute code (instructions code) stored in a memory, which causes the processing circuitry to execute a method, including one provided by a website and/or an application. The real time responsive server method 200 executed by the processing circuitry 154 and/or 184 may include Operations 201-210, as shown in FIG. 2, according to an embodiment. Although the Operations 201-210 are shown in an order in FIG. 2, the Operations 201-210 may be performed in a different order.

With reference to FIG. 2, according to an embodiment, the processing circuitry may be configured to perform a real time responsive server method 200 including one or more of the following operations: causing and/or controlling a display of an electronic terminal device to display a graphical user interface (GUI) with one or more user input areas (Operation 201); receiving, from the electronic terminal device, user input into the one or more displayed user input areas (Operation 202); determining, based on the received user input, weight values assigned to a plurality of respective media playlists (Operation 204). With reference to the displaying the GUI, Operation 201 may include transmitting GUI display control information to the user terminal device over the network. The receiving of user input may be by way of a touch screen display panel provided on the user terminal device (e.g., smartphone or tablet).

According to an embodiment, media playlists may be audio or video item playlists. A multi-topic playlist (or also referred to as a user-defined mixed playlist (UDMP)) may be created based on using an existing multi-topic playlist/UDMP as a source for blending with another single topic playlist or another multi-topic playlist (as a second source). The single topic playlists may be unrelated (e.g., of different genres) and then combined into a multi-topic UDMP.

The responsive server method 200 may further include storing the determined weight values assigned to the plurality of respective media playlists in a real time database (Operation 206); receiving a user request to play audio or video (Operation 208); and in response to receiving the user request: performing user-defined mixed playlist playback (Operation 210). When reference is made to storing in the database, the database may be located in the server, the user terminal device and/or a cloud, and the receiving of the UDMP playback request may include transmitting the request from the user terminal device to the server over the network The Operation 210 (performing UDMP playback) may correspond to one or more operations of method 300 of FIG. 3. Method 300 may include the processing circuitry: (i) automatically limiting a currently-playable set of playlists to playlists, from among the plurality of playlists, that satisfy a weight condition (Operation 302), (ii) automatically randomly selecting a playlist from among the limited currently-playable set of playlists (Operation 304), (iii) automatically dynamically selecting a song (or video) from the randomly selected playlist (Operation 306), (iv) automatically performing playback control to cause the selected song (or video) to be played (Operation 308), and (v) automatically updating, in the real time database, the play count of the selected playlist in the randomly selected playlist to reflect the selected playlist has been played (Operation 310). Operation 310 may correspond to accumulating the play count of the specific playlist. Operation 310 may further include accumulating a play count of the specific song or video played and preventing repeating of songs or videos during a full playback of a playlist. Operation 306 may correspond to automatically dynamically selecting, in a shuffle mode, a song (or video) from the randomly selected playlist.

According to an embodiment, the satisfaction of the weight condition may be based on a result of a comparison between the respective stored weight value of the respective media playlist and the play count of the respective media playlist.

Figure 4A:
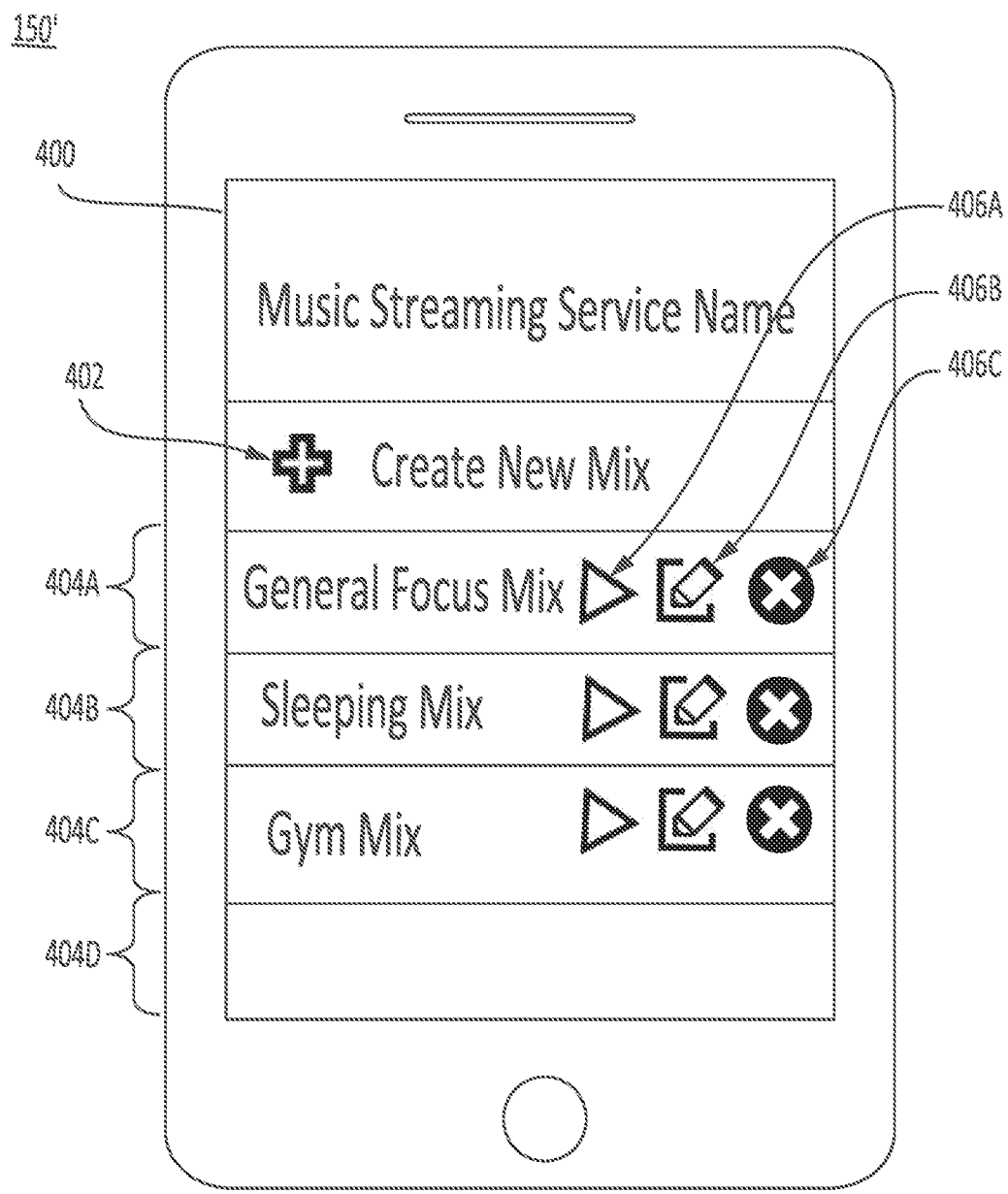
FIG. 4A illustrate a display screen of an electronic terminal device displaying a home screen related to media streaming, according to certain embodiments.

FIG. 4A illustrates a display screen or GUI 400 of an electronic terminal device 150' displaying an example of a media streaming home screen graphical user interface (GUI) (hereinafter referred to as home GUI 400). The home GUI 400 may be considered a starting point where a user may perform various operations related to streaming media by touching the touch display screen 400 which corresponds to the GUI 400. The home GUI 400 may include a title banner 400 ("Music Streaming Service Name"), a create new mix button 402, and one or more playlists 404 (e.g., Focus Music Mix 404A, Sleeping Mix 404B, Gym Mix 404C).

Figure 4B:
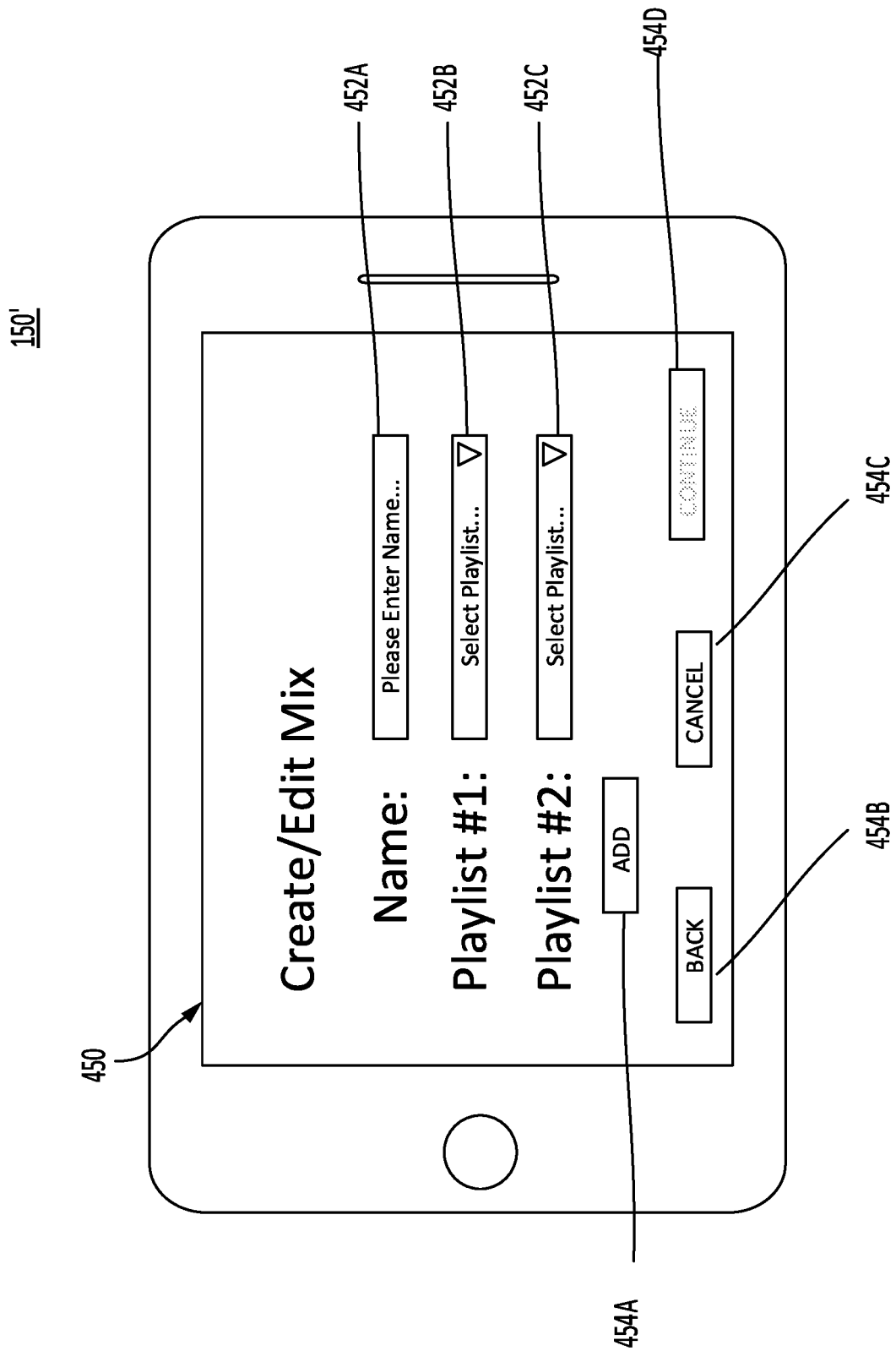
FIGS. 4B-4E illustrate a display screen of an electronic terminal device displaying a transition of create/edit screens related to media streaming, according to certain embodiments.

The create new mix button 402 may cause the display screen 400 to transition from the home GUI of FIG. 4A to the create/edit GUI 450 of FIG. 4B. Referring back to FIG. 2, the home GUI 400 may correspond to the start position in FIG. 2, and, after the create new mix button 402 is interacted with (e.g., clicked or tapped), Operation 201 may be performed (i.e., display GUI with input areas, and the displayed GUI with input areas may correspond to the create/edit GUI 450 of FIG. 4B). The display screen (physical component) and GUI (what is displayed on the display screen) overlap in the drawings and may be referred to interchangeably by the reference number(s) (e.g., the reference number 450 may refer to the display screen 450 or the GUI 450, e.g., of FIG. 4B).

Each of the playlists 404 may include one or more buttons such as a play button 406A, an edit button 406B and a delete button 406C. The play button 406A may cause the respective (same row) playlist to begin playback. The edit playlist button 406B may allow the user to perform editing of the playlists, such as add songs, delete songs, etc. The delete button 406C may cause the respective (same row) playlist to be deleted. The edit button 406B, when clicked, may cause the display screen to display an edit screen, such as in FIG. 4B or 4C.

FIG. 4B illustrates a display screen 450 of an electronic terminal device 150' displaying an example of a media streaming create new/edit UDMP GUI (hereinafter referred to as create/edit GUI 450). The create/edit GUI 450 may be considered a page where a user may create a new UDMP and/or edit an existing UDMP based on existing source playlists, which may be unrelated playlists.

A user may perform various operations related to streaming media by touching the touch display screen 450 which corresponds to the create/edit GUI 450. The create/edit GUI 450 may include user input areas 452 (e.g., name user input area 452A and playlist source user input areas (or drop-down menus) 452B, 452C), and buttons 454 (e.g., add button 454A, back button 454B, cancel button 454C and continue button 454D). The drop-down menus may be populated based on existing names of source playlists associated with the logged in user in the database.

The name user input field 452A may be configured to receive a user-defined name for the new playlist that is to be created (this field may also be edited). For example, when the name user input field 452A is interacted with (e.g., clicked/touched), a pop-up virtual keyboard or the like may be displayed for allowing the user to enter a name using the virtual keyboard.

Each of the playlist source user input fields 452B, 452C may be configured to accept a user input corresponding to a source playlist. A drop-down menu or displayable list of existing playlists may be displayed when a user interacts with (clicks/touches) the source user input fields 452B, 452C. For example, the drop-down menu/displayable list may include all playlists associated with the logged in user within the media streaming services database.

Figure 4C:
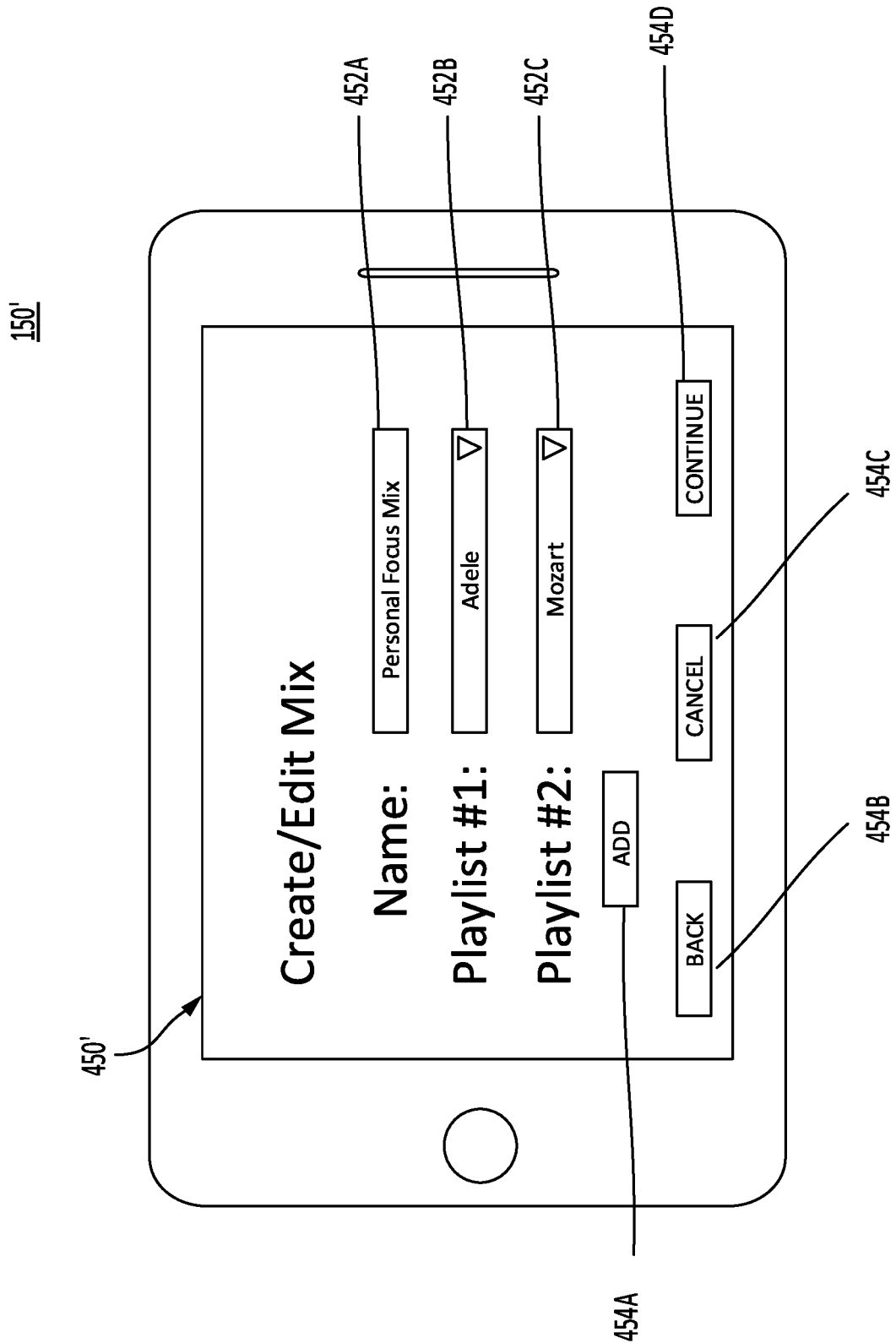

After the user has input the name in user name input field 452A, and selected or entered two playlists in source input fields 452B, 452C, the continue button 454D may be enabled, as shown in FIG. 4C. The continue button 454D may be disabled (e.g., indicated by being greyed out/not active in FIG. 4B) prior to a condition being met, such as a condition of at least two playlists being entered/selected for fields 452B and 452C. The name could be auto-generated (e.g., "Mixed Playlist 1" could be an auto-generated name) if no name is entered.

The add button 454A may be configured to add an additional line (e.g., Playlist #3:) with another playlist source input field on the same line. The back button 454B may revert to the previous screen and the cancel button 454C may be configured to cancel any changes on the currently-displayed screen (e.g., the creation of a new UDMP and/or edits/changes). When the continue button 454D is interacted with, the display screen of the electronic terminal 150' may transition from displaying the create/edit GUI 450' to displaying the weight GUI 470 of FIG. 4D.

Figure 4D:
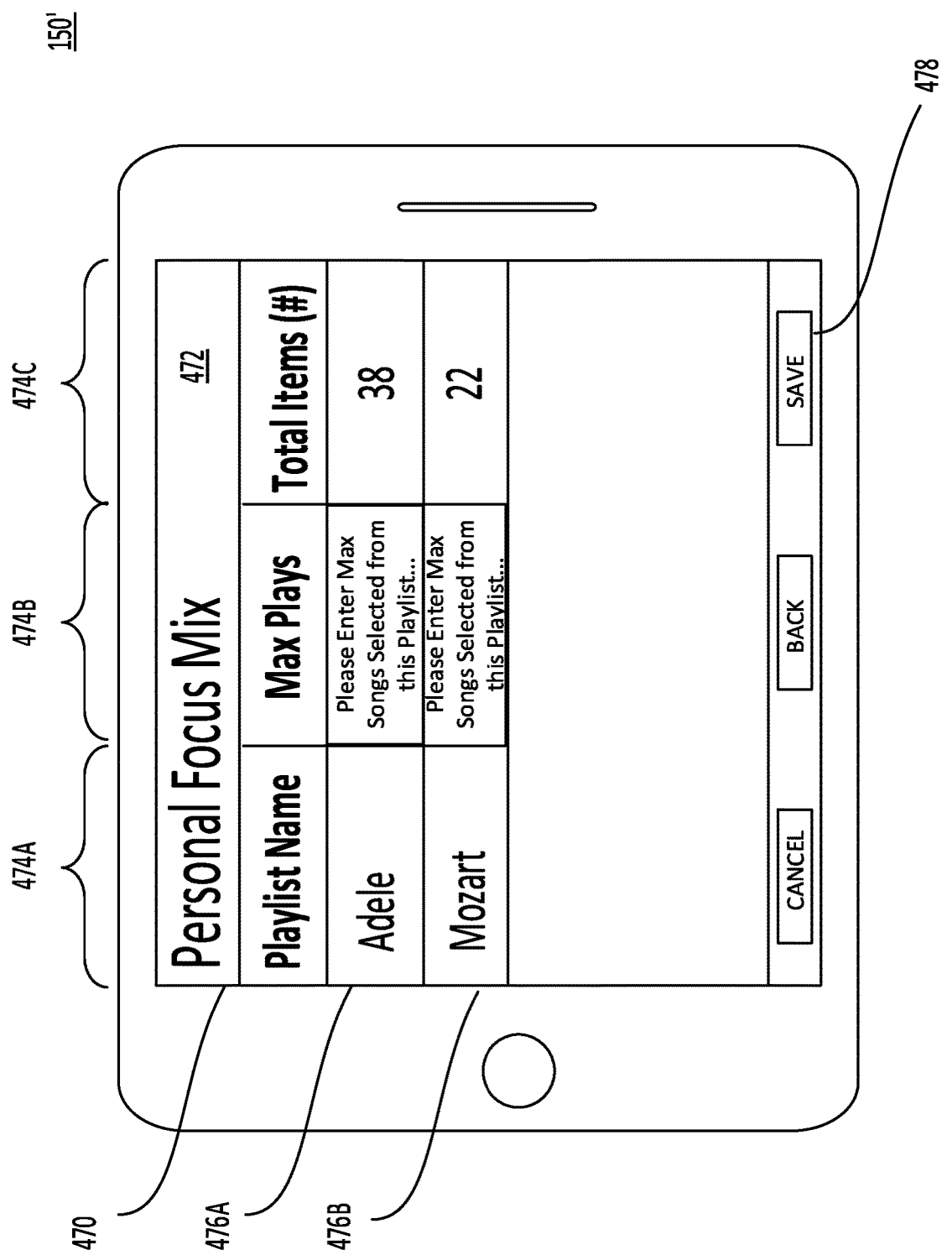

FIG. 4D illustrates a display screen 470 of an electronic terminal device 150' displaying an example of a media streaming weight mix GUI (hereinafter referred to as weight GUI 470). The weight GUI 470 may display the name of the UDMP 472, and may be considered a page where a user may input information indicating weights to apply to each of the source playlists.

The weight GUI 470 may further display a source playlist name column 474A, a weight column 474B and a total media item(s) value 474C. Each row 476A, 476B of the weight GUI 470 may include the source playlist name in row 474A (e.g., Adele, Mozart), a box for receiving a user weight value in column 474B, and a calculated value of total media items associated with the respective source playlist in column 474C. The receiving of this user input in column 474B may correspond to Operation 202 of FIG. 2.

Figure 4E:
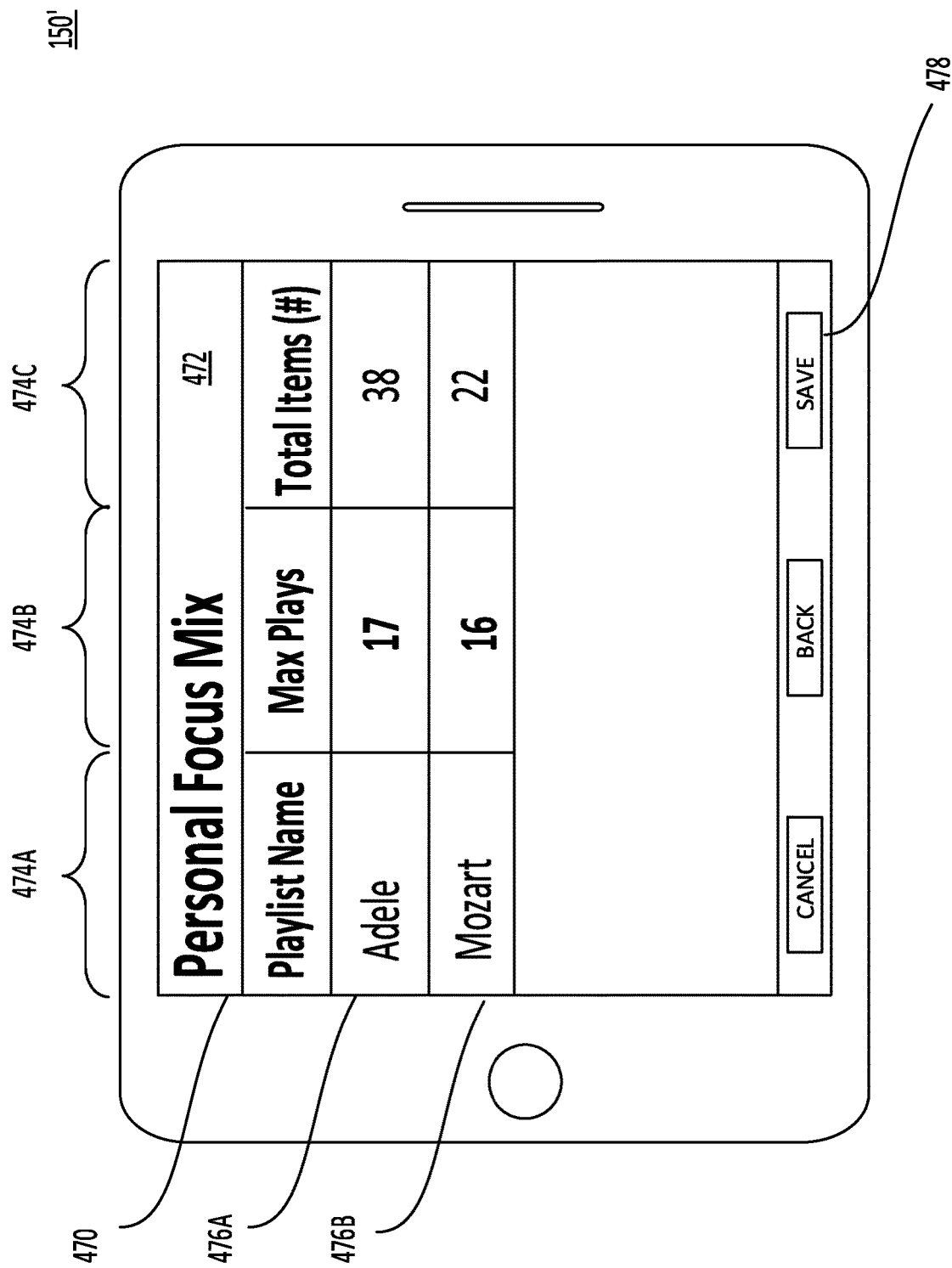

The user-entered weight value may correspond to a maximum number of songs selected from the playlist (or max selected songs of playlist (MSSP)). According to an embodiment, the MSSP is less than or equal to the total number of songs in the playlist. In this FIG. 4D, the total number of songs for the "Adele" playlist is "38" and the MSSP has not yet been entered. In FIG. 4E, the MSSP is "17" for the "Adele" playlist, as an example.

Figure 5A:
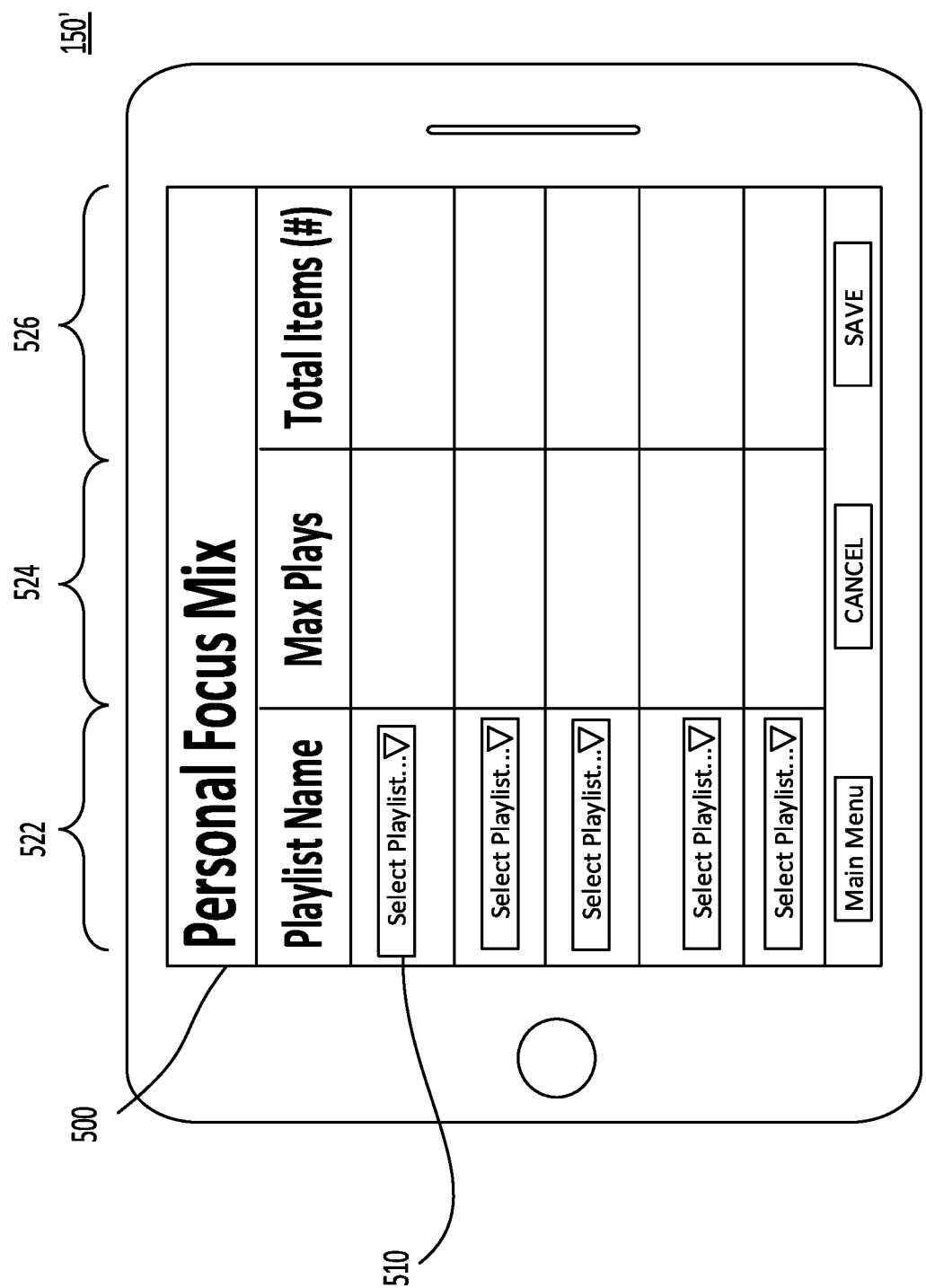
FIGS. 5A-5C illustrate a display screen of an electronic terminal device displaying a transition of create/edit screens related to media streaming, according to certain embodiments.
Figure 5B:
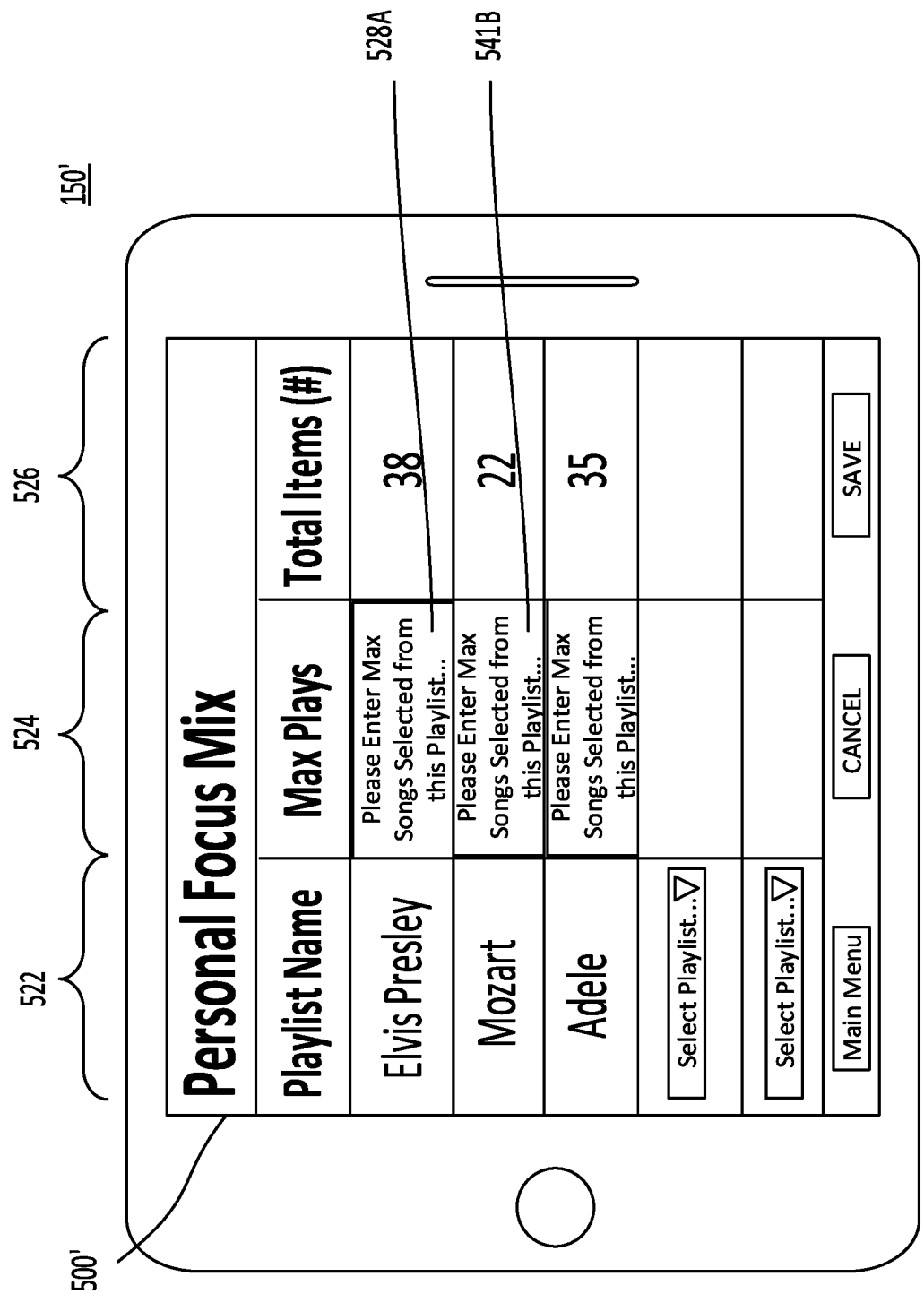
Figure 5C:
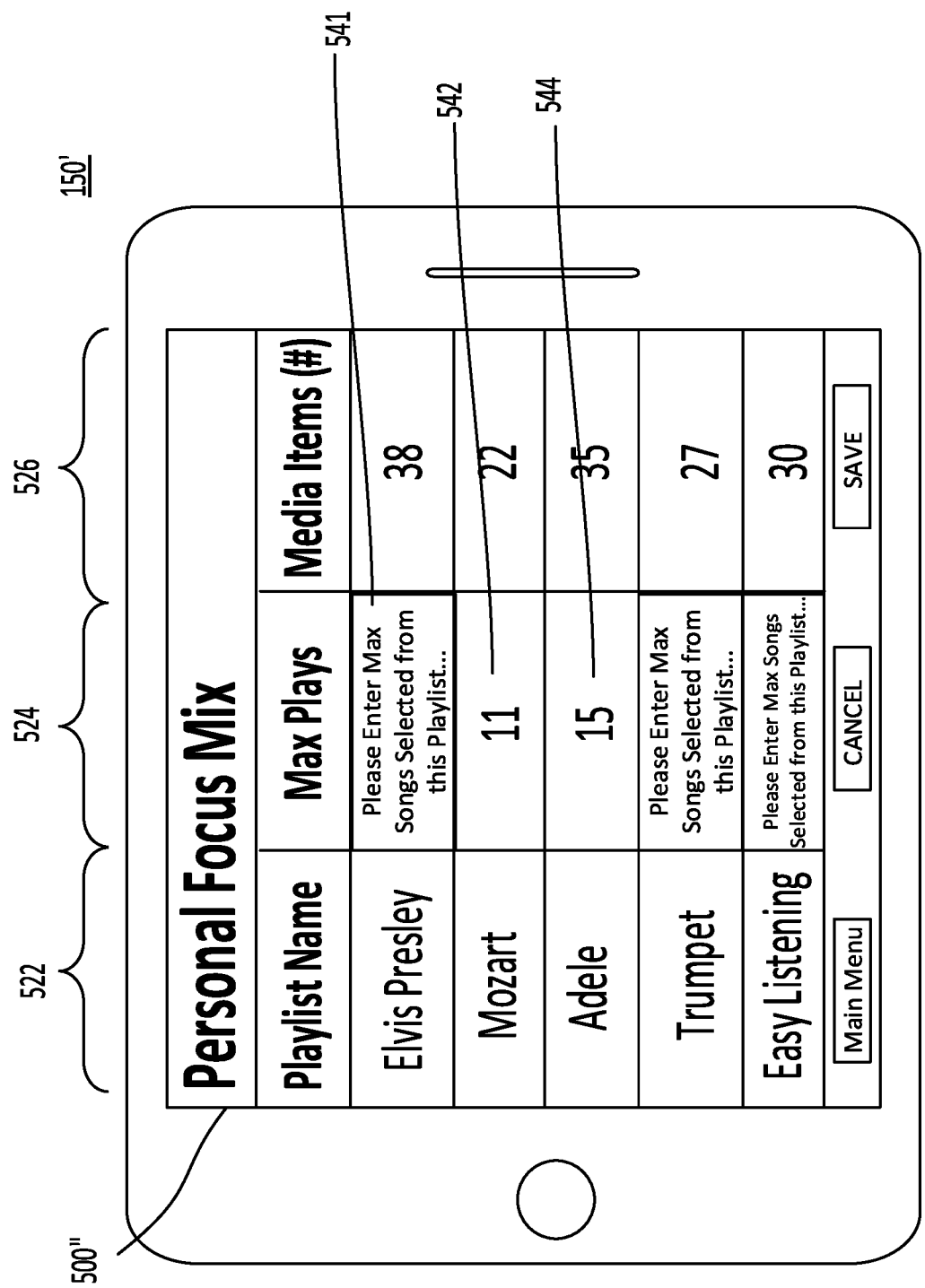

In FIGS. 4D, 5B and 5C, a prompt ("Please Enter Max Songs Selected from this Playlist") may be displayed to urge the user to enter in the number of songs from the source playlist that they wish to have selected during playback of the UDMP (titled: "Personal Focus Mix"). The "Max Songs" corresponds to the maximum number of songs in this playlist that are to be selected.

This prompt may be displayed on a line-by-line basis. That is, when "Elvis Presley" is entered in user input area in column 522 of the GUI 500' in FIG. 5B, the prompt may be automatically displayed in adjacent user input area 528A of FIG. 5B, as an example. Another example is when "Mozart" is entered in the user input area in column 522, the prompt may be automatically displayed in adjacent user input area 528B of FIG. 5B.

After the user has entered in the weight values (e.g., "17" entered in column 474B for Adele, and "16" entered in column 474B for Mozart) in the weight GUI 470, the weight value or MSSP may be determined (Operation 204) and shown on the screen (as shown in FIG. 4E). The determination of the weight values (e.g., MSSPs) may include using the user-entered weight value as the determined numerical weight value.

When the save button 478 is interacted with, the weight value may be stored in association with the new mixed playlist ("Personal Focus Mix") along with the number of media item(s) (e.g., 38 items for Adele and 22 for Mozart in this example), which may correspond to Operation 206. After Operation 206, a new UDMP has been created that has Adele with a weight of 17 and Mozart with a weight of 16.

Other Examples Include

UDMP 001: Mozart 3, Adele 15, Trumpet 2.
UDMP002: Elvis Presly 10, Beatles 1, Piano 1.
Once created, the UDMP (e.g., auto-named "UDMP 001" or user-named "Personal Focus Mix") can have playback started by clicking a play button 406A', as shown in FIG. 4F for new UDMP titled "Personal Focus Mix".

After Operation 206 (storing the weight values), a server(s) may receive a UDMP playback request from a user terminal (Operation 208) requesting play of a UDMP (e.g., by user input to a "play" or "playback" button) and, in response to receiving the UDMP playback request, may perform UDMP playback. UDMP playback may correspond to one or more operations of method 300 of FIG. 3.

According to an embodiment, the method 200 may correspond to a responsive server system method 200 performed by one or more hardware servers. Although an example order of operations is shown, the operations of the various methods may be performed in different orders. According to certain embodiments, "when", "in response to" and "based on" are considered trigger condition statements, and may be used interchangeably to mean a same or similar instance of a trigger condition.

Figure 4F:
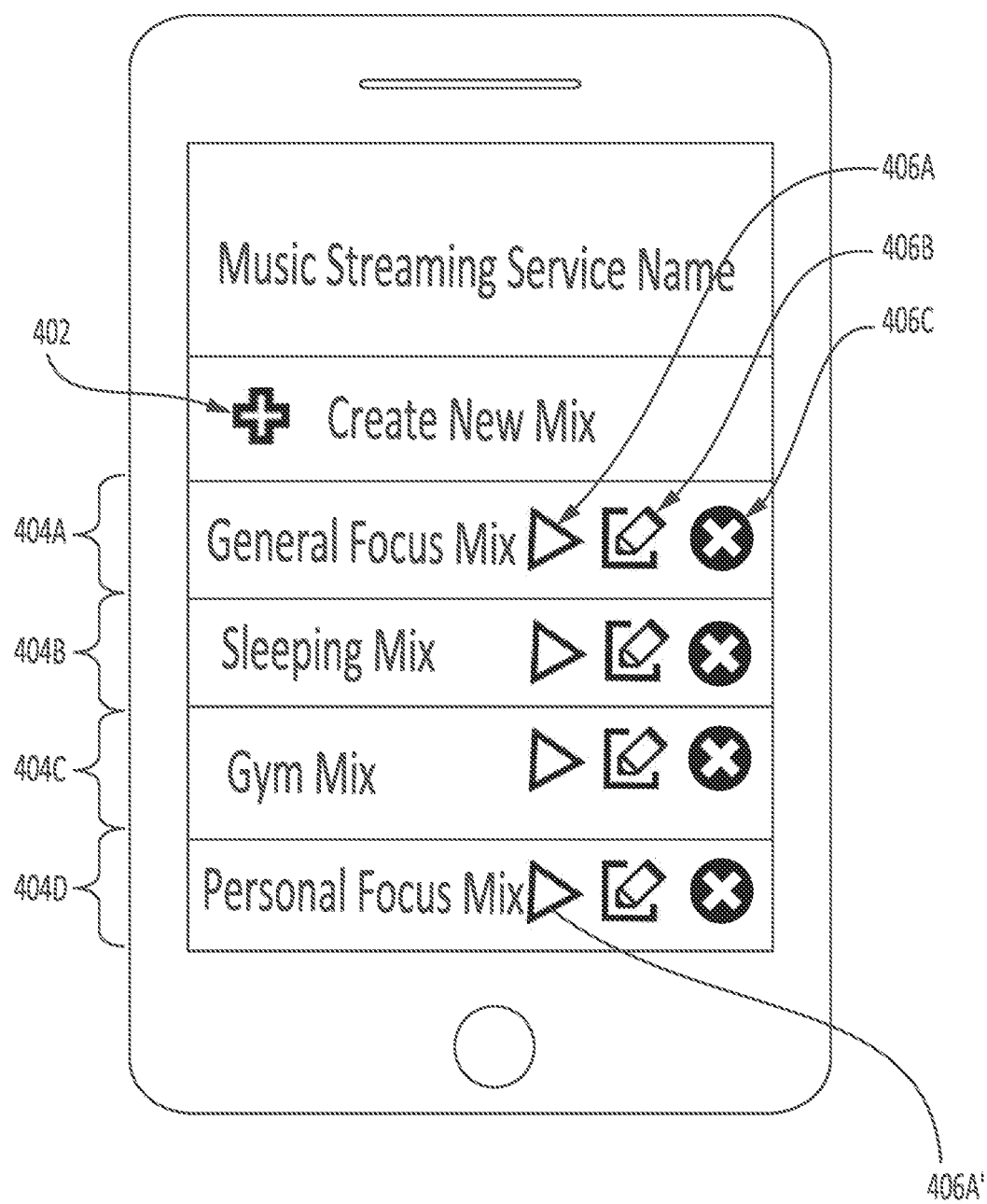
FIG. 4F illustrate a display screen of an electronic terminal device displaying a home screen related to media streaming, according to certain embodiments.

FIG. 4F illustrates a display screen 400 of an electronic terminal device 150' displaying an example of a home GUI 400 after the Personal Focus Mix (i.e., the UDMP) has been stored in the database. The user device may now play the newly added playlist, entitled "Personal Focus Mix" (a UDMP) in response to a user touching/clicking the play button 406A'. The playback of the UDMP is discussed in this disclosure.

FIG. 5A illustrates another example of a create/edit GUI 500, which may be displayed in response to user interaction (also referred to as click or touch) with the create new mix button 402 of FIG. 4A, according to certain embodiments. In response to a user selecting and/or touching the create new mix button 402 (FIG. 4A), then the create/edit GUI 500 may be displayed (e.g., caused to be displayed by the user terminal device based on information transmitted from the server).

The GUI 500 may include some or all of the display and user interface elements from FIGS. 4B-4D. For example, the create/edit mix GUI 500 may include user interface elements for allowing the user to enter a UDMP name, and select at least two source playlists while also providing functionality to enter the weight value, as discussed herein.

Although the source playlists are shown as legacy playlists, the source playlists may include one or more UDMP. That is, a new UDMP may be made from a mix of two or more UDMPs and zero or more legacy playlists. As shown in FIG. 5A, the create/edit GUI 500 may include a playlist source user input drop-down menu (or other user interface element) 510, which may correspond to playlist source user input area/UI element 452B, 452C, etc.

The GUI 500 may include a source playlist name column 522, a weight column 524 and a total media item(s) value 526, which may correspond to source playlist name column 474A, a weight column 474B and a total media item(s) value 474C. FIG. 5B shows create/edit GUI 500' after three playlists having been selected/entered into the screen of FIG. 5A, and their respective weights have been also been entered and the media item(s) are populated (from the database). The drop-down menu of legacy/source playlists may also be populated from the database. FIG. 5C shows the values of "11" and "15" having been entered for "Mozart" source playlist and "Adele" source playlist, respectively, in the respective user input fields 542, 544.

Figure 6:
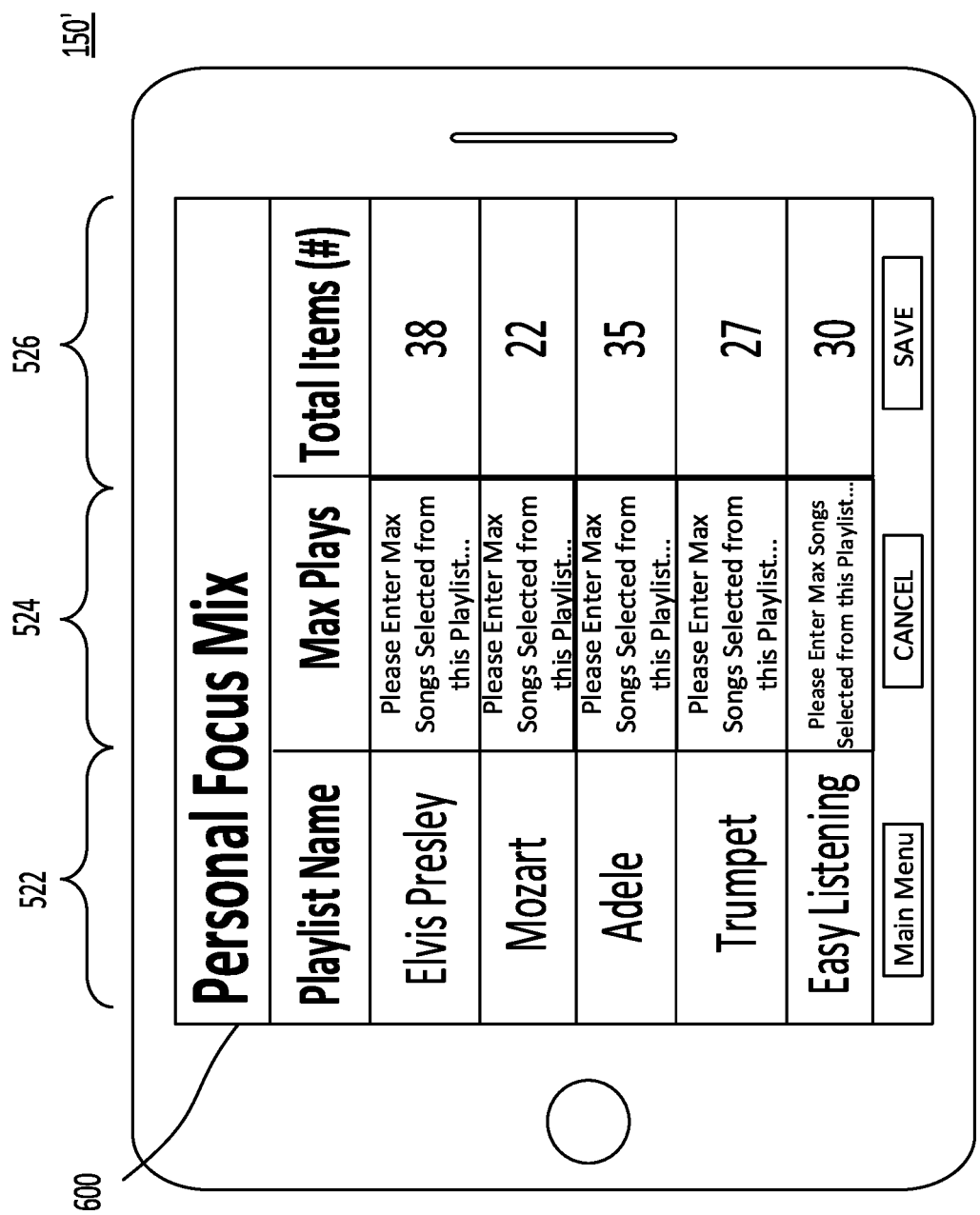
FIG. 6 illustrates a display screen of an electronic terminal device displaying a standalone create/edit screen, according to certain embodiments.

FIG. 6 illustrates another example of a create/edit GUI screen 600, which may be displayed in response to user interaction with (e.g., clicking/touching) the create new mix button 402 of FIG. 4A, according to certain embodiments. In response to a user selecting, clicking and/or touching the create new mix button 402 (FIG. 4A), then the create/edit mix GUI 600 may be displayed (e.g., caused to be displayed by the user terminal device based on information transmitted from the server.

A difference between FIG. 6 and FIGS. 5A-5C is that the create/edit mix GUI 600 does not include a step of the user selecting the playlists. Rather, all playlists associated with the logged in user (e.g., "Elvis Presley", "Mozart", "Adele", "Trumpet" and "Easy Listening") are all selected and/or displayed, and, by scrolling down, additional hidden playlists may be further displayed.

The GUI 600 is designed for less friction for the user by avoiding necessity of picking and choosing playlists. In FIG. 6, all the existing source playlists are displayed, with a total number of songs (e.g., the Media Items (#)). Also, a column 524 of UI input fields is displayed, titled Weight. A new UDMP, which is a weighted list of playlists (lists of media items, a list of songs) may be created by selecting playlists by inputting the weights, which may be entered or selected.

The user input elements may be one or more of drop-down menu of values (e.g., numerical weight values and/or source playlist names), alphanumeric text user input field, radio buttons or the like. The GUI may be in a two-dimensional grid shaped format and/or include user input fields or buttons. The GUI displays one or more editable user input fields in the two-dimensional grid shaped format on a row corresponding to the particular source playlist. The user interaction may correspond to selecting, tapping, touching, or clicking a button displayed by the GUI. The button may correspond to a hyperlinked Uniform Resource Locator (URL) that redirects the user to another GUI, as discussed herein.

The displayed table data can be developed into a DBMS (Data Base Management System), i.e., a Relational DBMS such as Oracle or SQL for easy access and in-depth analysis. The DBMS may correspond to the real time database discussed herein.

While explaining components of the system and/or the methods according to embodiments of the disclosure, a detailed description of the contents overlapping with the system(s) and/or methods according to the embodiments will be omitted (not repeated) and overlapping elements may correspond to previously described elements having a same or similar name. Although exemplary embodiments have been shown and described, the disclosure is not limited thereto, and various modifications and variations are possible within the scope of the appended drawings and the detailed description. It will be appreciated by ordinarily-skilled artisans that changes may be made in these the embodiments without departing from the principles and spirit of the general inventive concept.

The invention claimed is:

1. A responsive server system method performed by one or more hardware servers, the responsive server system method comprising:
    causing a display of an electronic terminal device to display a graphical user interface (GUI) with at least two user input areas, wherein the at least two user input areas include a first source playlist user input area and a second source playlist user input area;
    receiving, from the electronic terminal device, a first indication of a first name corresponding to a first source playlist and a second indication of a second name corresponding to a second source playlist, wherein the first name corresponds to text displayed in the first source playlist user input area and the second name corresponds to text displayed in the second source playlist user input area, the first name corresponding to the first source playlist and the second name corresponding to the second source playlist are different names, and each being a name of an existing audio or video media item playlist;
    receiving, from the electronic terminal device, a maximum play count associated with the first source playlist and a maximum play count associated with the second source playlist;
    storing, as part of a user-defined mixed playlist (UDMP) in a database, the maximum play count associated with the first source playlist and the maximum play count associated with the second source playlist;
    receiving a real time user request to play the UDMP; and
    in response to receiving the real time user request to play the UDMP, performing real time dynamic playback of the UDMP,
    wherein the performing of the real time dynamic playback of the UDMP includes:
        obtaining a current play count of the first source playlist and a current play count of the second source playlist, wherein a playable set of source playlists includes the first source playlist and the second source playlist,
        automatically limiting the playable set of source playlists to source playlists that have a current play count that is less than a respective associated maximum play count,
        automatically randomly selecting a next source playlist from among the limited playable set of source playlists,
        automatically dynamically selecting a next song from the randomly selected next source playlist,
        automatically performing playback control to cause the dynamically selected next song to be played, and
        automatically updating, in the database, a current play count of the randomly selected next source playlist to reflect that the dynamically selected next song has been played,
    wherein the performing of the real time dynamic playback of the UDMP includes executing the operations recursively during a playback period, and the playback period ends when all of the songs of the playable set of source playlists have been played.

2. The responsive server system method of claim 1, wherein a previous source playlist and the next source playlist are not prevented from being the same during the random selection.

3. The responsive server system method of claim 1, wherein the next song is selected from the randomly selected next source playlist in a shuffle mode, wherein the shuffle mode requires that no songs from a same source playlist are repeated during a playback period.

4. The responsive server system method of claim 1, wherein the GUI displays maximum play count user input areas adjacent to respective titles of the plurality of source playlists, the titles including the first name and the second name.

5. The responsive server system method of claim 4, wherein each of the titles of the source playlists correspond to at least one of: an artist, a genre, a composer, or an instrument.

6. The responsive server system method of claim 1, wherein at least one of the first source playlist user input area and the second source playlist user input area is a drop-down menu.

7. The responsive server system method of claim 6, wherein at least one of the first source playlist user input area and the second source playlist user input area is a drop-down menu, and each drop-down menu is populated based on existing names of source playlists in the database.

8. The responsive server system method of claim 7, wherein the existing names of source playlists are names of source playlists associated with a logged in user in the database.

9. The responsive server system method of claim 1, further comprising causing a pop-up virtual keyboard to be displayed for allowing the user to enter a name using the virtual keyboard, when one of the first source playlist user input area or the second source playlist user input area is clicked or touched.

10. A responsive server system comprising:
a memory; and
processing circuitry, wherein the processing circuitry is configured to execute computer-executable instructions stored in the memory to perform the following operations:
causing a display of an electronic terminal device to display a graphical user interface (GUI) with at least two user input areas, wherein the at least two user input areas include a first source playlist user input area and a second source playlist user input area;
receiving, from the electronic terminal device, a first indication of a first name corresponding to a first source playlist and a second indication of a second name corresponding to a second source playlist, wherein the first name corresponds to text displayed in the first source playlist user input area and the second name corresponds to text displayed in the second source playlist user input area, the first name corresponding to the first source playlist and the second name corresponding to the second source playlist are different names, and each being a name of an existing audio or video media item playlist;
receiving, from the electronic terminal device, a maximum play count associated with the first source playlist and a maximum play count associated with the second source playlist;
storing, as part of a user-defined mixed playlist (UDMP) in a database, the maximum play count associated with the first source playlist and the maximum play count associated with the second source playlist;
receiving a real time user request to play the UDMP; and
in response to receiving the real time user request to play the UDMP, performing real time dynamic playback of the UDMP, wherein the performing of the real time dynamic playback of the UDMP includes:
obtaining a current play count of the first source playlist and a current play count of the second source playlist, wherein a playable set of source playlists includes the first source playlist and the second source playlist,
automatically limiting the playable set of source playlists to source playlists that have a current play count that is less than a respective associated maximum play count,
automatically randomly selecting a next source playlist from among the limited playable set of source playlists,
automatically dynamically selecting a next song from the randomly selected next source playlist,
automatically performing playback control to cause the dynamically selected next song to be played, and
automatically updating, in the database, a current play count of the randomly selected next source playlist to reflect that the dynamically selected next song has been played,
wherein the performing of the real time dynamic playback of the UDMP includes executing the operations recursively during a playback period, and the playback period ends when all of the songs of the playable set of source playlists have been played.

11. The responsive server system of claim 10, wherein a previous source playlist and the next source playlist are not prevented from being the same during the random selection.

12. The responsive server system of claim 10, wherein the next song is selected from the randomly selected next source playlist in a shuffle mode, wherein the shuffle mode requires that no songs from a same source playlist are repeated during a playback period.

13. The responsive server system of claim 10, wherein the GUI displays maximum play count user input areas next to respective titles of the plurality of source playlists, the titles including the first name and the second name.

14. A non-transitory computer-readable medium comprising computer-executable instructions that, when executed by processing circuitry, cause the processing circuitry to perform the following operations:
causing a display of an electronic terminal device to display a graphical user interface (GUI) with at least two user input areas, wherein the at least two user input areas include a first source playlist user input area and a second source playlist user input area;
receiving, from the electronic terminal device, a first indication of a first name corresponding to a first source playlist and a second indication of a second name corresponding to a second source playlist, wherein the first name corresponds to text displayed in the first source playlist user input area and the second name corresponds to text displayed in the second source playlist user input area, the first name corresponding to the first source playlist and the second name corresponding to the second source playlist are different names, and each being a name of an existing audio or video media item playlist;
receiving, from the electronic terminal device, a maximum play count associated with the first source playlist and a maximum play count associated with the second source playlist;
storing, as part of a user-defined mixed playlist (UDMP) in a database, the maximum play count associated with the first source playlist and the maximum play count associated with the second source playlist;
receiving a real time user request to play the UDMP; and
in response to receiving the real time user request to play the UDMP, performing real time dynamic playback of the UDMP, wherein the performing of the real time dynamic playback of the UDMP includes:
obtaining a current play count of the first source playlist and a current play count of the second source playlist, wherein a playable set of source playlists includes the first source playlist and the second source playlist, automatically limiting the playable set of source playlists to source playlists that have a current play count that is less than a respective associated maximum play count, automatically randomly selecting a next source playlist from among the limited playable set of source playlists, automatically dynamically selecting a next song from the randomly selected next source playlist, automatically performing playback control to cause the dynamically selected next song to be played, and automatically updating, in the database, a current play count of the randomly selected next source playlist to reflect that the dynamically selected next song has been played, wherein the performing of the real time dynamic playback of the UDMP includes executing the operations recursively during a playback period, and the playback period ends when all of the songs of the playable set of source playlists have been played.

\* \* \* \* \*